March 13, 1962 P. C. BEAN 3,024,821
FRUIT PEELING APPARATUS
Filed Nov. 12, 1957
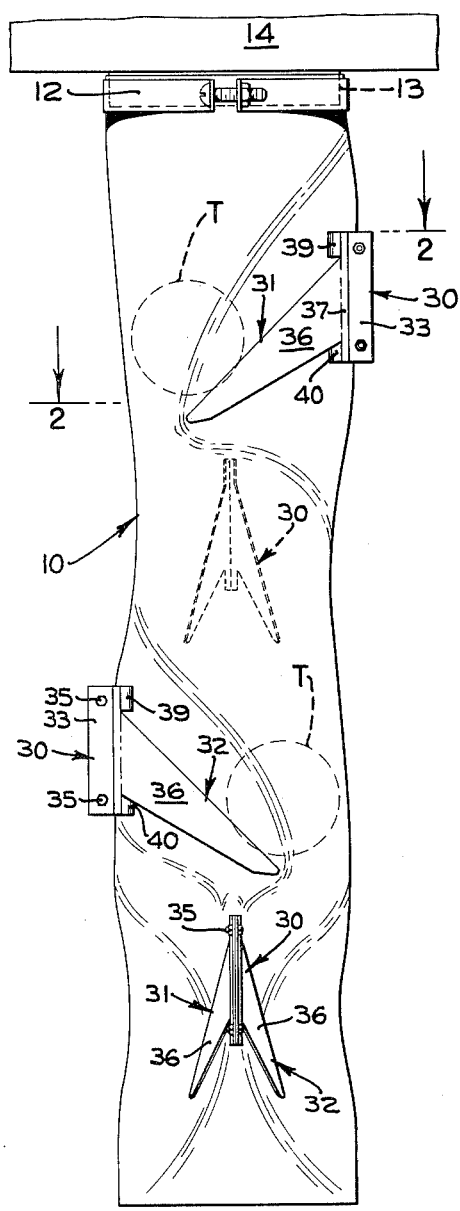
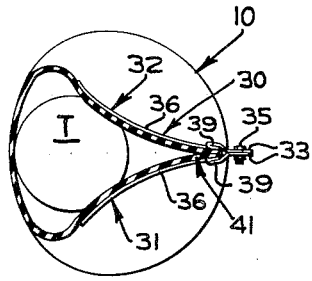
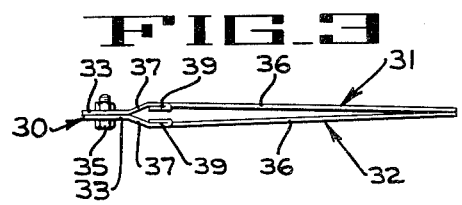
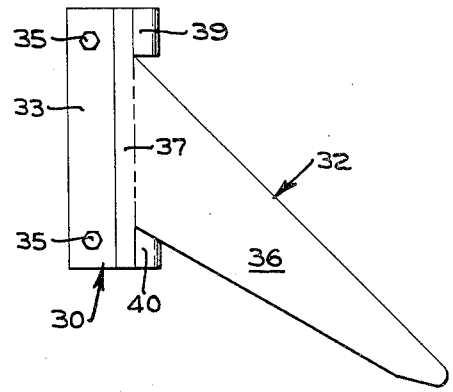
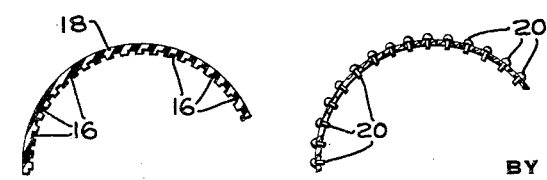
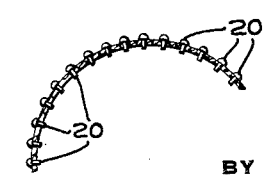
INVENTOR
PAUL C. BEAN
BY Hans G. Hoffmeister
ATTORNEY

3,024,821
FRUIT PEELING APPARATUS
Paul C. Bean, Cupertino, Calif., assignor to FMC Corporation, a corporation of Delaware
Filed Nov. 12, 1957, Ser. No. 695,727
5 Claims. (Cl. 146—49)

This invention pertains to fruit processing apparatus and more particularly relates to an apparatus for peeling fruit.

In peeling fruit, such as tomatoes, the fruit is treated with a caustic solution to weaken the skin of the fruit and loosen the skin from the flesh. After this treatment, the weakened skin is still disposed around the fruit and must be completely removed without damaging the flesh of the fruit.

It is an object of the present invention to provide an improved apparatus for peeling fruit.

Another object is to provide an improved clamp device for use in a fruit peeling mechanism.

Another object is to provide means in association with a tubular member for positively directing fruit against the inner wall surface thereof to peel the fruit.

Other and further objects and advantages of the present invention will become apparent from the following description taken in connection with the accompanying drawings in which:

FIG. 1 is an elevation of the fruit peeling apparatus of the present invention, shown mounted in depending relation on a support.

FIG. 2 is a horizontal section taken on line 2—2 of FIG. 1.

FIG. 3 is a plan of a clip used on the peeler of FIG. 1.

FIG. 4 is an elevation of the clip of FIG. 3.

FIG. 5 is a fragmentary section taken transversely of the peeling tube of a modified form of the peeling apparatus of the present invention.

FIG. 6 is a fragmentary section similar to FIG. 5, showing a second modification of the peeling tube of the present invention.

The fruit peeler of the present invention comprises a tubular member 10 (FIG. 1) that is secured by a clamp 12 to a tubular flange 13 which is formed about a suitable opening (not shown) in the lower wall of a hopper or chute 14. The hopper 14 is adapted for use with a machine which is arranged to apply caustic solution to the fruit to weaken and loosen the skin and deliver the fruit to the hopper 14. The fruit falls into the opening from the hopper 14 and through the tubular flange 13 into the tubular peeling member 10.

The peeling member 10 may take the form of any member that has means defining a tortuous passage along which the tomato must move as it descends. The member acts to abrade the peel of the tomato and may be formed of any coarse-textured material, such as burlap or canvas, or it may be made of a relatively smooth material whose inner surface has been roughened as by providing serrations or grooves 16 (FIG. 5) in a tube 18 made of rubber. In one embodiment, the peeling member 10 is made of a sponge rubber material having a plurality of small projections on its inner surface. Alternately, the member 10 may have an inner surface formed by securing a plurality of rivets 20 (FIG. 6) to the member so that the inner ends of the rivets provide a plurality of projections adapted to engage the skin of the fruit.

The tortuous passage through the peeling member is formed by internal abutment or deflector wall portions that intercept and directs the fruit laterally as it drops. In the embodiment of the invention shown in FIG. 1, the tortuous path is provided by means of a series of V-shaped spring steel clamps or clips 30 that are positioned on the tube 10 in spaced relation longitudinally of the tube with each clip displaced 90° around the tube from the adjacent clips. As seen in FIG. 2, each clip 30 restricts the vertical passage in the member. Accordingly, each tomato is forced to contact the inner walls of the tube as it approaches one of the clips and, upon passing the clip, each tomato is shifted laterally into engagement with the wall opposite the clip as it moves downwardly and is aligned with the next clip. By the time the tomato leaves the lower end of the tube the skin, which has been weakened by the lye treatment, is stripped from the tomato. It will be noted in FIG. 2, that the restricted portion of the passage may be made smaller in area than the effective cross-section of the tomato T so that the clamp at this portion of the passage must open a small amount to permit the tomato to move therethrough. With this arrangement, a large area of the skin of the tomato is contacted by the peeling surface as it moves through the restricted passage.

As seen in FIGS. 3 and 4 each clip 30 comprises two opposed plates 31 and 32 which are identical but are oppositely disposed. Each plate has a flat portion 33 which is secured in abutting relation to the flat portion of the other plate by bolts 35. A generally triangular portion 36 of each plate is connected to the associated flat portion 33 by a slanted connecting wall 37. Since the two walls 37 slant in opposite directions, the triangular portions 36 are spaced from each other adjacent the slanted walls 37 but are in contact at their outer ends. To position a clip on the tube, the outer ends of the triangular portions 36 are separated and the clip is then placed on the tube. The natural resiliency of the spring steel causes an upper pair 39 and a lower pair 40 of inturned tabs (FIGS. 3 and 4) to grip the tube, as seen in FIG. 2. The triangular portions 36 press the side wall portions inwardly toward each other to form obstructions that restrict the passage in the tube.

It will be evident that the tortuous passage through the tube may be formed by means other than the clips 30, as by sewing together those wall portions of the tube that are held together by the clips, as for example the wall portions indicated generally by the arrow 41 in FIG. 2.

The peeled tomatoes may be collected in any collecting means disposed below the peeling tubes 10.

From the foregoing description it will be seen that the present invention provides a novel efficient apparatus for peeling fruit. The nature of the inner surface of the peeling tube and the arrangement of the tortuous passage therethrough are such that the fruit is not only shifted from side to side in the tube as it falls but is also moved in a circular path around the axis of the tube. This combined side-to-side and rotary movement causes a comprehensive contact of the fruit with the roughened surface of the peeling tube whereby all of the skin of the fruit is removed.

In the appended claims, the term "rough" will be used to generically indicate the nature of the interior surface of the peeling tube.

It will be understood that modifications and variations of the invention disclosed herein may be made without departing from the scope of the present invention.

Having thus described the invention, what is claimed as new and is desired to be protected by Letters Patent is:

1 Apparatus for peeling fruit comprising a tube having yieldable wall portions, and a plurality of clips disposed at longitudinally spaced points on said tube, each clip having two resilient arms disposed in stressed condition and in opposed relation with adjacent wall portions of said tube disposed in pinched position therebetween whereby the tube at each clamp is partially collapsed and the passageway is restricted.

2. Apparatus for peeling fruit comprising a tube of yieldable material, a plurality of clamps disposed in spaced relation on said tube, each clamp including a pair of resilient arms adapted to engage exterior wall portions of said tube and move the corresponding inner wall portions toward each other to form a restricted area in the central passage in said tube, said area being smaller in size than the size of a fruit, the resiliency of said arms being effective to permit the arms to move away from each other to enlarge said restricted area when a fruit moving through the passage engages the inner wall of the tube at said restricted area.

3. In apparatus for peeling fruit, a tube of flexible material positioned for conducting fruit therethrough, said tube having a coarse textured inner surface defining a longitudinal passage, and transversely extending means engaging adjacent outer surface portions of said tube partly collapsing the tube to restrict the passage, the parts of the tube collapsed by said means forming obstructions at opposing regions of the tube while leaving the tube portion intermediate said regions free and unobstructed, said obstructions deflecting a fruit gravitating through the tube into engagement with the free and unobstructed region of the tube intermediate the obstructions, said collapsing means maintaining said obstructions and free region of the tube in frictional engagement with the fruit to strip peel from the fruit while the fruit moves past the obstructions.

4. In apparatus for peeling fruit, a tube of flexible material positioned for conducting fruit therethrough, said tube having a coarse textured inner surface defining a longitudinal passage, and a plurality of means engaging adjacent outer surface portions of said tube partly collapsing the tube to restrict the passage at spaced intervals along said tube, the parts of the tube collapsed by said means forming obstructions at opposing regions of the tube while leaving the tube portion intermediate said regions free and unobstructed, said obstructions deflecting a fruit gravitating through the tube into engagment with the free and unobstructed region of the tube intermediate the obstructions, said collapsing means maintaining said obstructions and the free region of the tube in frictional engagement with the fruit to strip peel from the fruit while the fruit moves past the obstructions.

5. In apparatus for peeling fruit, a vertically extending tube for conducting an advancing fruit, said tube having a coarse textured inner surface defining a passage through the tube and a plurality of means engaging the outer surface of said tube, and spaced vertically along the tube and angularly about the axis of the tube, each of said means partly collapsing the tube to restrict the adjacent region of the passage, the part of the tube collapsed by each of said means forming an obstruction at one side of the tube and laterally of the associated restricted region of the passage, each of said obstructions deflecting laterally a fruit advancing through said tube, the angular spacing of said obstructions about the axis of the tube being effective to deflect the advancing fruit successively in different directions to direct the advancing fruit around the tube to bring different surface portions of the fruit into frictional engagement with the inner surface of the tube opposite the obstructions, said collapsing means maintaining each of said obstructions and the inner surface of the tube in the associated restricted region in frictional engagement with the fruit to peel the fruit while the fruit moves past the obstructions.

References Cited in the file of this patent
UNITED STATES PATENTS

| | | |
|---|---|---|
| 564,881 | Gould | July 28, 1896 |
| 809,582 | Robinson | Jan. 9, 1906 |
| 873,234 | Hestness | Dec. 10, 1907 |
| 1,013,506 | Miller | Jan. 2, 1912 |
| 1,410,951 | Park | Mar. 28, 1922 |
| 1,546,530 | Akahoshi | July 21, 1925 |
| 1,976,710 | Carpentieri | Oct. 16, 1934 |
| 2,497,532 | Berkman | Feb. 14, 1950 |
| 2,616,819 | Ford | Nov. 4, 1952 |
| 2,781,070 | Kilburn et al. | Feb. 12, 1957 |
| 2,847,334 | Kilburn et al. | Aug. 12, 1958 |
| 2,910,392 | Magnuson | Oct. 27, 1959 |
| 2,936,012 | Magnuson et al. | May 10, 1960 |